(No Model.)

J. L. STEVENS.
FRUIT PACKING CASE.

No. 415,074. Patented Nov. 12, 1889.

Witnesses.

Inventor
John L. Stevens
by Scrivner & Boone
his Attorneys

UNITED STATES PATENT OFFICE.

JOHN L. STEVENS, OF SAN FRANCISCO, CALIFORNIA, ASSIGNOR TO THE STEVENS FRUIT PACKING CASE COMPANY.

FRUIT-PACKING CASE.

SPECIFICATION forming part of Letters Patent No. 415,074, dated November 12, 1889.

Application filed July 22, 1887. Serial No. 245,033. (No model.)

*To all whom it may concern:*

Be it known that I, JOHN L. STEVENS, of the city and county of San Francisco, State of California, have invented an Improvement in Fruit-Packing Cases; and I do hereby declare that the following is a full, clear, and exact description thereof.

My invention relates to that class of packing-cases in which strips of card-board, paper, wood veneer, or other thin flexible or elastic substance are joined together so as to form trays having cells or compartments, in each of which an article of fruit is to be packed; and it consists in the construction and combination of parts hereinafter set forth and claimed.

Figure 1:
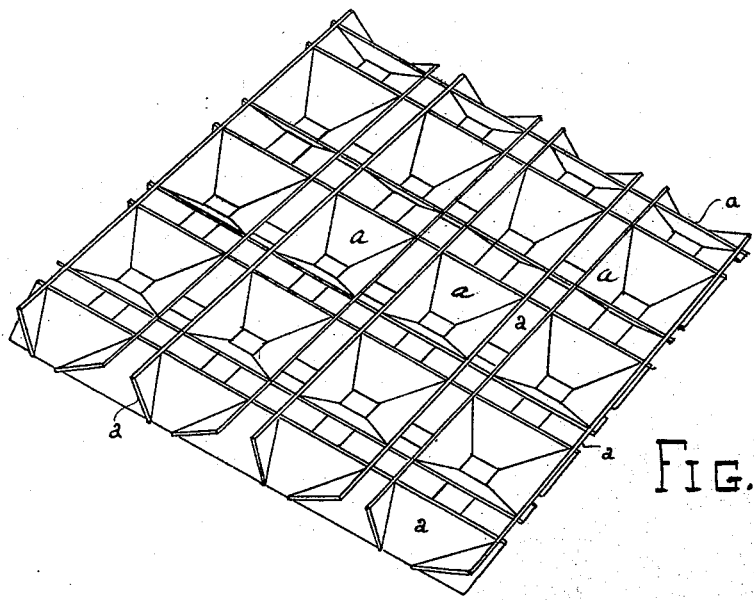
Figure 2:
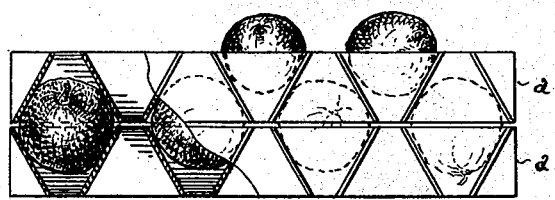
Figure 3:
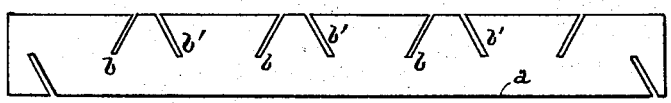

Referring to the accompanying drawings, Figure 1 is a perspective view of a packing-tray constructed after the plan herein set forth; Fig. 2, an end elevation, partly broken away, of two similar trays. Fig. 3 is a plan view of one of the strips.

Let $a\ a\ a$ represent narrow strips of card-board, paper, or other flexible or elastic material, the width of which is about one-half the diameter of the article of fruit to be packed. One edge of each of the strips $a$ is formed with diverging or V-shaped slits $b\ b'$, which are situated in pairs and extend about half-way across the width of the strip of card-board, as shown at Fig. 3, so that the strips can be interlocked together in the slits at right angles to each other, and thus form trays in the ordinary way, only each tray will have hopper-shaped cells on both sides which alternate with each other. It will be noticed that a space exists between the slits $b\ b'$ at the edge of the strips, so that when the strips are locked together a corresponding width of space is left between them and also at the bottom of each cell or compartment, so that when a number of these trays are placed one upon another a complete system of ventilation is provided through and around each cell.

In using these packing-trays they are usually placed in a box one upon the other and an article of fruit—such as a peach, an orange, an apricot, or other fruit to be packed—is placed one in each cell so that it rests upon the inclined sides of the cell, and as the cells only have a depth equal to one-half the diameter of the fruit one-half of the body of the fruit will project above the tray. The next tray above is then placed over the filled tray, so that the cells on its under side will fit down over the fruit in the lower trays, and then be ready to receive fruit in its top cells. It will thus be seen that it takes two trays to form a complete set of cells, the fruit being supported in the upper cells of a tray and covered by the cells on the under side of the next tray, and that the cells thus formed alternate with the cells of the layer above. By this arrangement I am able to utilize the packing-space in the box to its full extent, because the articles of fruit, being alternated, lie close together, but are yet separated by the elastic strips or sides of the cells. The space in the bottom of each cell and the spaces on each side form ventilation-passages which, when the trays are all filled, will give a complete circulation into and around each cell that will keep the fruit cool, while the angular or diverging arrangement of the sides of the cells provides a yielding bed or rest for the fruit that prevents it from being bruised or injured.

Having thus described my invention, what I claim, and desire to secure by Letters Patent, is—

1. A fruit-packing case composed of two or more trays, each of which has cells on both its upper and under side which alternate with each other, so that the cells on the under side serve as a cover to form the upper half of the corresponding upper cells in the lower tray, the strips composing said trays having diverging angular slits arranged in pairs extending from their edges to nearly the middle of the strip, substantially as and for the purpose set forth.

2. A packing-tray for fruit, composed of narrow flexible or elastic strips $a$, having diverging angular slits $b\ b'$, arranged in pairs, extending from their edges to near the middle of the strip and interlocked together through the slits at right angles to each other, substantially as described.

In witness whereof I have hereunto set my hand.

JOHN L. STEVENS.

Witnesses:
GEO. W. STEVENS,
M. G. LOEFLER.